(12) United States Patent  
Vandervoord et al.

(10) Patent No.: US 12,441,416 B2
(45) Date of Patent: Oct. 14, 2025

(54) BODY MOUNTED SPARE TIRE TAILGATE

(71) Applicant: FCA US LLC, Auburn Hills, MI (US)

(72) Inventors: Gregory Vandervoord, Clarkston, MI (US); Dan M Zimmermann, West Bloomfield, MI (US); Mark C Trostle, Bloomfield Hills, MI (US); Michael S Sullivan, Washington, MI (US)

(73) Assignee: FCA US LLC, Auburn Hills, MI (US)

( * ) Notice: Subject to any disclaimer, the term of this patent is extended or adjusted under 35 U.S.C. 154(b) by 148 days.

(21) Appl. No.: 18/325,702

(22) Filed: May 30, 2023

(65) Prior Publication Data
US 2024/0400140 A1    Dec. 5, 2024

(51) Int. Cl.
*B62D 43/02* (2006.01)
*B62D 33/027* (2006.01)

(52) U.S. Cl.
CPC ........... *B62D 43/02* (2013.01); *B62D 33/027* (2013.01)

(58) Field of Classification Search
CPC ...................................................... B62D 43/02
USPC ...................................................... 224/42.21
See application file for complete search history.

(56) References Cited

U.S. PATENT DOCUMENTS

| | | | | |
|---|---|---|---|---|
| 1,548,985 A | * | 8/1925 | Dickenson | B62D 43/02 414/466 |
| 2,052,970 A | * | 9/1936 | Erbeck | B62D 43/002 414/466 |
| 3,283,973 A | * | 11/1966 | Wargo | B62D 43/02 414/466 |
| 3,583,734 A | * | 6/1971 | Magi | B60R 1/0617 248/478 |
| 3,610,658 A | * | 10/1971 | Sartori | B60R 3/02 414/466 |
| 4,116,373 A | * | 9/1978 | Bryngelson | B62D 43/02 414/463 |
| 4,971,237 A | * | 11/1990 | Davis | B62D 43/02 211/20 |
| 5,094,374 A | | 3/1992 | Lee | |
| 5,183,192 A | | 2/1993 | Mrozowski et al. | |
| 6,631,834 B2 | | 10/2003 | Slovick | |
| 7,597,222 B2 | | 10/2009 | Bishop et al. | |
| 9,902,440 B2 | | 2/2018 | Burton et al. | |
| 10,800,313 B2 | | 10/2020 | Frederick et al. | |
| 10,858,050 B2 | | 12/2020 | Headlee | |
| 2005/0274760 A1 | | 12/2005 | Buckner et al. | |

(Continued)

FOREIGN PATENT DOCUMENTS

| | | | | |
|---|---|---|---|---|
| DE | 602005002909 T2 | | 7/2008 | |
| EP | 1378425 A1 | * | 1/2004 | ............... B60J 5/101 |

(Continued)

*Primary Examiner* — Scott T McNurlen
(74) *Attorney, Agent, or Firm* — Jeremy J. Klobucar

(57) ABSTRACT

A tailgate frame for a vehicle with a tubular cross bar and the frame pivotally attach with the vehicle. A spare tire support pivot tube is rotatably mounted on the tubular cross bar to enable the spare tire support to move between a first inboard and a second outboard position on the vehicle. A spare tire mounting bracket is coupled with the pivot tube. The spare tire mounting bracket has a shaft that extends from pivot tube and terminates at a plate that receives the spare tire. The spare tire mounting bracket, in the first position, mounts the spare tire in the vehicle and, in the second position, mounts the spare tire outside of the vehicle.

14 Claims, 3 Drawing Sheets

(56) References Cited

U.S. PATENT DOCUMENTS

| | | | | |
|---|---|---|---|---|
| 2006/0091171 A1 | * | 5/2006 | Wardell | ................. B62D 43/02 |
| | | | | 224/508 |
| 2009/0267385 A1 | * | 10/2009 | Shackleford | ............ B60R 3/007 |
| | | | | 248/219.3 |
| 2010/0264187 A1 | * | 10/2010 | Buskirk | .................... B60R 9/06 |
| | | | | 224/42.21 |
| 2017/0021876 A1 | | 1/2017 | Silva et al. | |

FOREIGN PATENT DOCUMENTS

| | | | |
|---|---|---|---|
| FR | 1055703 A | * | 2/1954 |
| FR | 3060514 A1 | | 6/2018 |

\* cited by examiner

BODY MOUNTED SPARE TIRE TAILGATE

FIELD

The present disclosure relates to vehicles and, more particularly, to a body mounted spare tire tubular tailgate.

BACKGROUND

This section provides background information related to the present disclosure which is not necessarily prior art.

Vehicle have various types of ways to mount and retain spare tires on the vehicle. Once way is a bumper mounted exterior spare tire mount. This provides access to the spare tire from outside the vehicle. Also, vehicles may have a body mounted swing gate and an exterior spare tire mount that are also outside the vehicle. The vehicle may include a floor mount spare tire mounting or a basket mount spare tire mounting within and under a floorboard of the vehicle. While these types of spare tire mounts or spare tire storage are satisfactory for their intended purpose, designers are striving to improve storage of the spare tire on the vehicle.

The present disclosure provides an improved spare tire storage that enables the spare tire to be mounted inboard or outboard of the vehicle with the same mounting device. The present disclosure improves spare tire changing operation from a two person job to a one person job. When the spare tire is positioned inboard of the vehicle, it improves the departure angle of the vehicle. By placing the spare tire closer to the floor, it becomes an easier lift to fasten it to the mount. The inboard mounted spare tire is to help mitigate spare tire removal and installation. The spare tire would be bounced or rolled into the cargo area and then be lifted onto the spare tire mounting plate. When the spare tire is positioned outboard of the vehicle, it provides for additional interior cargo volume.

SUMMARY

This section provides a general summary of the disclosure, and is not a comprehensive disclosure of its full scope or all of its features.

According to a first object of the disclosure, a spare tire support to couple with a tailgate including a tubular cross bar comprises a pivot tube to be rotatably mounted on the tubular cross bar to enable the spare tire support to move between a first and second position. A spare tire mounting bracket is coupled with the pivot tube. The spare tire mounting bracket includes a shaft extending from the pivot tube. A plate receives the spare tire. The spare tire mounting bracket, in the first position, mounts the spare tire inboard of the vehicle. In the second position, the spare tire mounting bracket mounts the spare tire outboard of the vehicle. The plate includes at least one bolt receiving member to secure the spare tire onto the mounting bracket. A locking member locks the spare tire support in the first and second position. The locking member is generally at least one clevis pin coupling the pivot tube and the tubular cross bar. The clevis pin extends through an aperture in the pivot and tubular cross bar locking the spare tire bracket in both the first and second positions. Alternatively, the locking member includes at least two spring detents to couple the pivot tube to the tubular cross bar locking the spare tire bracket in the first and second positions. The spare tire mounting bracket in the first position is positioned on a first side or above a horizontal plane passing through the tubular cross bar. In the second position, the mounting bracket is on a second opposite side or below the horizontal plane.

According to a second aspect of the disclosure, a tailgate for a vehicle comprises a frame including a tubular cross bar. The frame includes members to attach the tailgate with the vehicle. A spare tire support includes a pivot tube rotatably mounted on the tubular cross bar to enable the spare tire support to move between a first and second position, the spare tire mounting bracket mounts the spare tire outboard of the vehicle. The plate includes at least one bolt receiving member to secure the spare tire onto the mounting bracket. A locking member locks the spare tire support in the first and second position. The locking member is generally at least one clevis pin coupling the pivot tube and the tubular cross bar. The clevis pin extends through an aperture in the pivot and tubular cross bar locking the spare tire bracket in both the first and second positions. Alternatively, the locking member includes at least two spring detents to couple the pivot tube to the tubular cross bar locking the spare tire bracket in the first and second positions. The spare tire mounting bracket in the first position is positioned on a first side or above a horizontal plane passing through the tubular cross bar. In the second position, the mounting bracket is on a second opposite side or below the horizontal plane.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
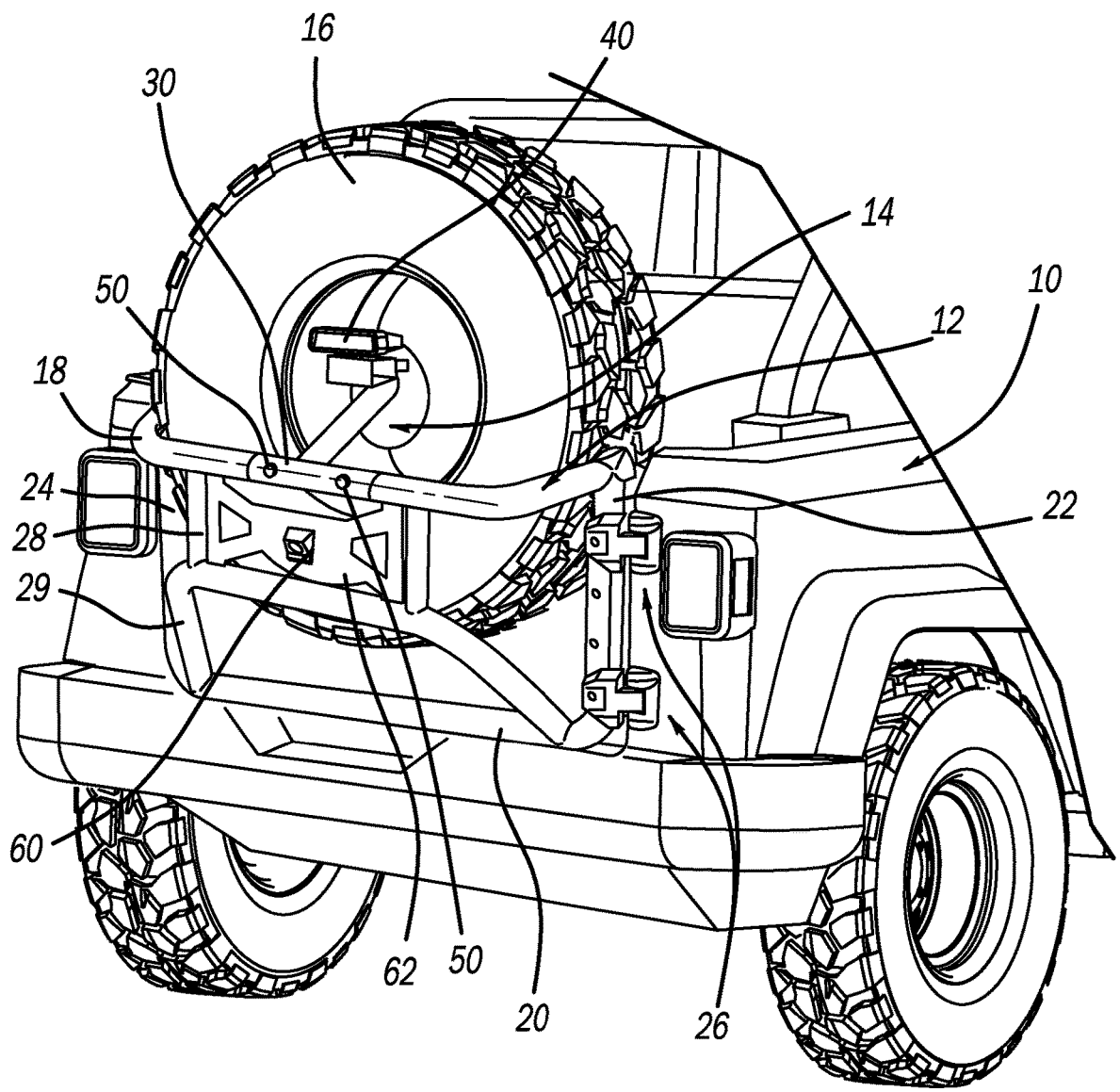
FIG. 1 is a rear perspective view of the vehicle including a tailgate with a spare tire mounting bracket.
Figure 2:
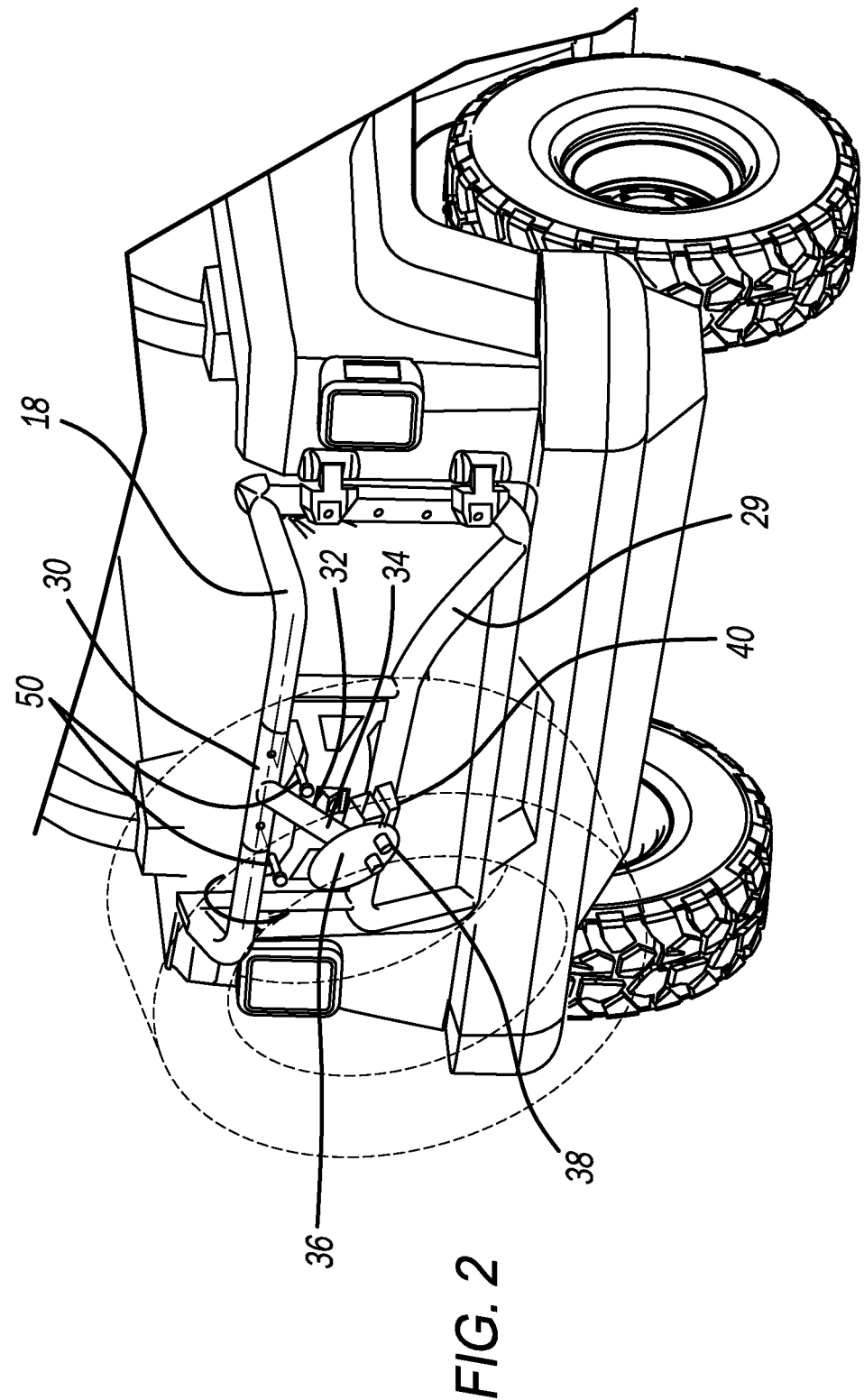
FIG. 2 is a view like FIG. 1 with the tire removed and the spare tire mounting bracket in a second position.

Example embodiments will now be described more fully with reference to the accompanying drawings.

Turning to the figures, a vehicle is illustrated and designated with the reference numeral 10. The vehicle may be a convertible open top vehicle as illustrated. The vehicle 10 includes a tailgate 12 secured to the body of the vehicle 10. The tailgate 12 includes a spare tire support 14 to support a spare tire 16 inboard or outboard of the vehicle 10.

The tailgate 12 is of a tubular construction and includes a first cross bar 18 and a second cross bar 20 secured to one another with a pair of stanchions 22, 24. The stanchions 22 includes hinges 26 that are attached to the body to enable the tailgate to swing open. The stanchion 24 has a catch that latches to secure with a latch inside the vehicle. Additionally, reinforcement members 28, 28 are positioned between the first and second cross bars 18, 20. The cross bars 18, 20 are generally cylindrical and have a desired diameter giving them a circular configuration in cross section.

The spare tire support 12 includes a pivot tube 30 positioned around the top cross bar 18. The pivot tube 30 enables rotation or movement of the spare tire support 12 with respect to the cross bar 18. Due to the cylindrical design of the pivot tube 30 and cross bar 18, the pivot tube 30 easily rotates on the cross bar 18. A spare tire mounting bracket 32 is coupled with the pivot tube 30. The spare tire mounting bracket 32 includes a shaft 34 and a plate 36. The shaft 34 is generally a tubular member welded or the like with the pivot tube 30. The shaft 34 is angled with respect to the pivot tube to provide positioning of the spare tube 18 inboard of the vehicle and outboard of the vehicle. As the spare tire mounting bracket 32, along with the spare tire, is rotated via the pivot tube, the spare tire moves from inside the vehicle to outside the vehicle.

The plate 36 is positioned at the end of the shaft 34. The plate 36 may be welded or the like to be secured with the shaft 34. The plate 36 generally has a circular or disk configuration to be fit within the spare tire to provide a mounting surface. Additionally, tire securement members 38, such as lugs welded or the like to the plate 36, receive fasteners to secure the spare tire with the mounting bracket 32. The lugs 38 can be threaded or the like and receive a bolt to secure the spare tire onto the mounting plate 36.

Additionally, a vehicle light 40 may be positioned onto the shaft 34 or plate 36 to provide a brake light or running light when the vehicle is in operation.

The pivot tube 30 as well as the top cross bar 18 include apertures to receive a clevis pin 50. The clevis pin 50 is passed through both the pivot tube 30 as well as the tubular cross bar 18. This locks the spare tire support 32 in its first and second positions. In the first position, the support bracket 32 is within the vehicle holding the spare tire 16 within the vehicle 10. After the clevis pin 50 is removed from the pivot tube 30 and tubular cross bar 18, the spare tire support 14 can then be rotated so that the spare tire bracket 32 is outside of the vehicle. The clevis pins 50 would then be placed into the apertures to lock the spare tire support 14 in the second position. The apertures are utilized for both the first and second positions. Additionally, a spring detent could be utilized projecting from the tubular cross bar.

A rear facing camera 60 is generally positioned onto a bracket 62 providing the camera for back-up purposes. The bracket 62 is generally secured with one of the reinforcement members 28.

Figure 3:
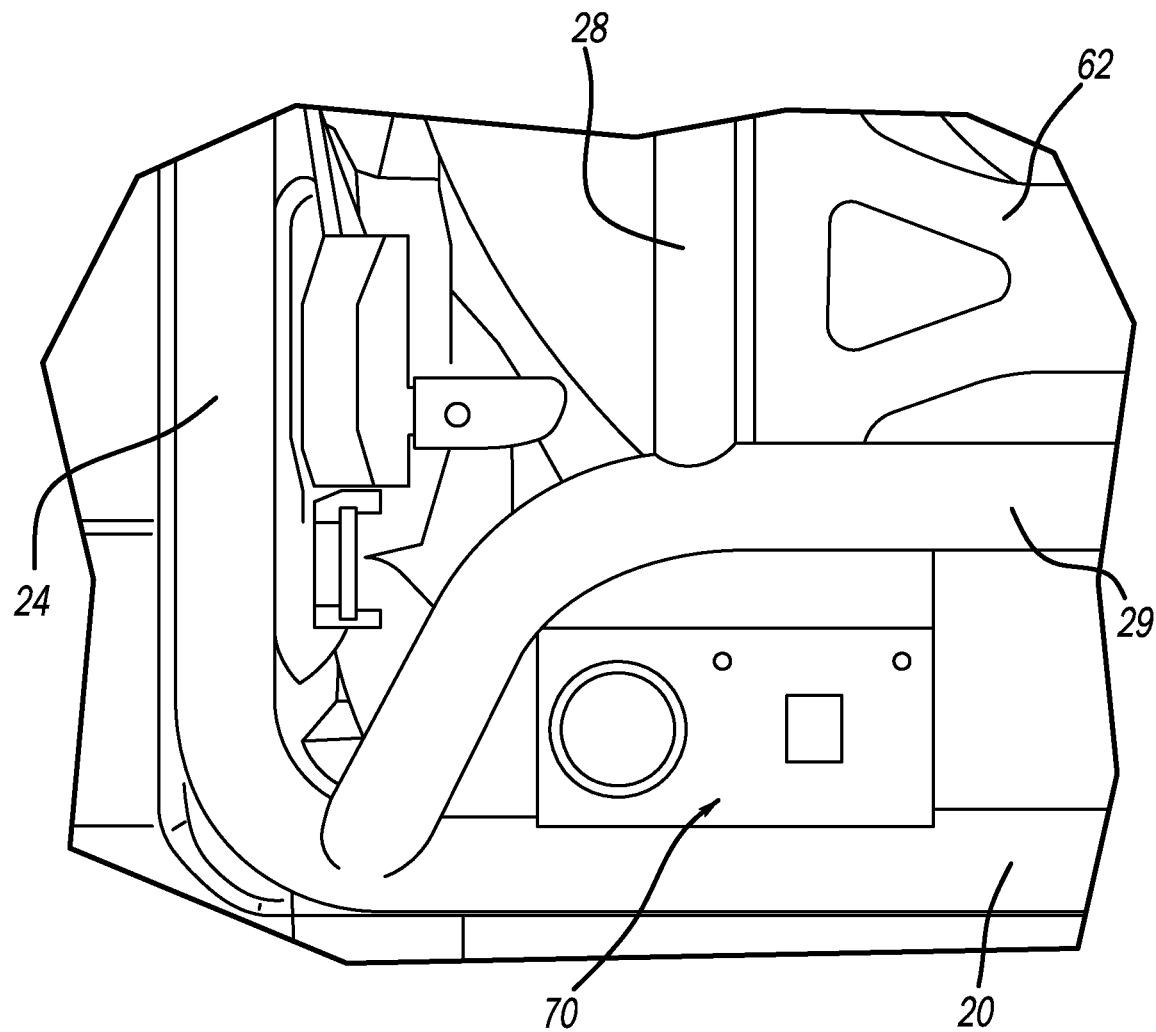
FIG. 3 is an elevation view of a tailgate of FIG. 1 with an optional back up camera.

FIG. 3 illustrates a camera positioned between the bottom tubular cross bar 20 and the reinforcement member 28. The camera 70 enables rear viewing when the spare tire is in the second position blocking the camera 60.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A spare tire support for coupling with a vehicle tailgate including an upper tubular cross bar and a lower tubular cross bar, the spare tire support comprising:
    a pivot tube rotatably mounted on the upper tubular cross bar enabling the spare tire support to move between a first position and a second position; and
    a spare tire mounting bracket coupled with the pivot tube so as to be rotatable about the upper tubular cross bar with the pivot tube, the spare tire mounting bracket including a shaft extending from the pivot tube and a plate for receiving the spare tire,
    wherein the spare tire mounting bracket in the first position mounts the spare tire inboard of the vehicle and in the second position mounts the spare tire outboard of the vehicle.

2. The spare tire support of claim 1, the plate including at least one bolt receiving member for securing the spare tire to the mounting bracket.

3. The spare tire support of claim 1, further comprising a locking member for locking the spare tire support in the first and second position.

4. The spare tire support of claim 3, wherein the locking member including at least one clevis pin coupling the pivot tube to the upper tubular cross bar.

5. The spare tire support of claim 4, wherein the clevis pin extends through the pivot tube and the upper tubular cross bar locking the spare tire bracket in both the first and second positions.

6. The spare tire support of claim 3, wherein the locking member including at least two spring detents for coupling the pivot tube and upper tubular cross bar and locking the spare tire bracket in the first and second positions.

7. The spare tire support of claim 1, wherein the spare tire mounting bracket in the first position is positioned on a first side of a horizontal plane passing through the pivot tube and in the second position on a second opposite side of the horizontal plane.

8. A vehicle comprising:
    a vehicle body;
    a tailgate including an upper tubular cross bar and a lower tubular cross bar that each extend between and are connected to a pair of stanchions, one of the stanchions being connected to the vehicle body by at least one hinge that permits the tailgate to pivot relative to the vehicle body along a first axis and the other stanchion including a latch to secure the tailgate to the vehicle body;
    a spare tire support having a pivot tube rotatably mounted on the upper tubular cross bar enabling the spare tire support to move between a first position and a second position; and
    a spare tire mounting bracket that is coupled and rotatable with the pivot tube about the upper tubular cross bar such that the spare tire mounting bracket rotates about a second axis arranged orthogonal to the first axis,
    wherein the spare tire mounting bracket includes a shaft extending from the pivot tube and a plate for receiving the spare tire, and
    wherein the spare tire mounting bracket in the first position mounts the spare tire inboard of the vehicle body and in the second position mounts the spare tire outboard of the vehicle body.

9. The vehicle of claim 8, wherein the plate includes at least one bolt receiving member for securing the spare tire onto the mounting bracket.

10. The vehicle of claim 8, further comprising a locking member for locking the spare tire support in the first and second position.

11. The vehicle of claim 10, wherein the locking member including at least one clevis pin coupling the pivot tube and the upper tubular cross bar.

12. The vehicle of claim 11, wherein the clevis pin extends through the pivot tube and upper tubular cross bar locking the spare tire bracket in both the first and second positions.

13. The vehicle of claim 10, wherein the locking member including at least two spring detents for coupling the pivot tube and upper tubular cross bar and locking the spare tire bracket in the first and second positions.

14. The vehicle of claim 8, wherein the spare tire mounting bracket in the first position is positioned on a first side of a horizontal plane passing through the upper tubular cross bar and in the second position on a second opposite side of the horizontal plane.

\* \* \* \* \*